(12) United States Patent
Welsh

(10) Patent No.: US 7,055,463 B2
(45) Date of Patent: *Jun. 6, 2006

(54) PET REGISTRATION, SEARCH AND RETRIEVAL SYSTEM

(76) Inventor: Deborah Tate Welsh, 649 W. Meyer Blvd., Kansas City, MO (US) 64113

(*) Notice: Subject to any disclaimer, the term of this patent is extended or adjusted under 35 U.S.C. 154(b) by 0 days.

This patent is subject to a terminal disclaimer.

(21) Appl. No.: 10/847,814

(22) Filed: May 18, 2004

(65) Prior Publication Data

US 2004/0236827 A1    Nov. 25, 2004

Related U.S. Application Data

(63) Continuation of application No. 09/483,172, filed on Jan. 14, 2000, now Pat. No. 6,792,465.

(51) Int. Cl.
*A01K 29/00* (2006.01)
(52) U.S. Cl. .................. 119/712; 119/720
(58) Field of Classification Search ............ 119/719, 119/720, 908, 712, 721; 709/229, 225, 217; 700/90, 115
See application file for complete search history.

(56) References Cited

U.S. PATENT DOCUMENTS

| | | | |
|---|---|---|---|
| 5,036,610 A | 8/1991 | Fehr | |
| 5,878,116 A | 3/1999 | Scott | |
| 5,912,956 A | 6/1999 | Longo et al. | |
| 6,003,473 A | 12/1999 | Printz | |
| 6,067,018 A | 5/2000 | Skelton et al. | |
| 6,172,640 B1 | 1/2001 | Durst | |
| 6,283,065 B1 | 9/2001 | Shorrock et al. | |
| 6,401,095 B1 | 6/2002 | Adler | |
| 6,449,611 B1 | 9/2002 | Frankel | |
| 6,502,060 B1 | 12/2002 | Christian | |
| 6,591,786 B1* | 7/2003 | Davis | 119/719 |
| 6,792,465 B1* | 9/2004 | Welsh | 709/229 |

OTHER PUBLICATIONS

Riley Identification Systems, Nov. 1999 www.rileyid.com/ridsys.html.*
Avid MicrosChip I.D., Dec. 2000 www.avidmicrochip.com.*

* cited by examiner

*Primary Examiner*—Teri Pham Luu
*Assistant Examiner*—Elizabeth Shaw
(74) *Attorney, Agent, or Firm*—Polsinelli Shalton Welte Suelthaus PC

(57) ABSTRACT

A nationwide, web-based pet registration, search and retrieval system. The system is implemented with a host computer (10) that may be accessed by users operating user computers (12) via a communications network (14) such as the Internet. Pet owners may register their pets with the host computer and finders of lost pets may search the host computer in an attempt to locate the owners of lost pets.

4 Claims, 2 Drawing Sheets

PET REGISTRATION, SEARCH AND RETRIEVAL SYSTEM

CROSS-REFERENCES TO RELATED APPLICATIONS

This Application is a Continuation of U.S. patent application Ser. No. 09/483,172, entitled: Pet Registration, Search and Retrieval System, filed on Jan. 14, 2000, now U.S. Pat. No. 6,792,465. U.S. patent application Ser. No. 09/483,172 is incorporated by reference herein.

BACKGROUND OF THE INVENTION

1. Field of the Invention

The present invention relates to pets and methods for reuniting lost pets with their owners. More particularly, the invention relates to a nationwide, web-based pet registration, search, and retrieval system.

2. Description of the Prior Art

It has been estimated that thousands of pets are lost each year in the U.S. alone. Current methods for reuniting lost pets with their owners are either largely ineffective, too costly or too complicated. For example, one such method requires a pet owner to purchase a personalized pet tag for their pet having the pet owner's name, address, and phone number printed thereon. A person who finds a pet with such a tag can then read the tag and call the pet's owner. This method is effective as long as the information on the tag is current; however, if the pet owner moves and/or changes phone numbers, the pet tags must be replaced with more current tags or else they are useless.

Other methods for locating lost pets include implanting identifying microchips in the pets or tattooing the pets. Both of these methods are expensive and painful for the pets and do not permit a finder of a pet to search for and contact the pet's owner at any time of day. Moreover, with the microchip methods, the finder of the pet must first determine that the pet has an implanted microchip and then locate a veterinarian or other animal facility that has a microchip scanner that can read the implanted microchip.

Several Internet web sites exist that assist in locating lost pets. These sites use a variety of methods such as posting pictures and descriptions of lost pets and information regarding where pets were lost. Unfortunately, the descriptions and information posted on these sites is often too limited and subjective to permit an exact match between a lost pet and its owner. Moreover, pet owners who lose their pets often do not add descriptions of their lost pets to these sites until days after their pets have been lost. If a person finds a pet and accesses one of the sites before the pet owner adds a description of the lost pet to the site, the finder will be unable to locate the pet owner.

OBJECTS AND SUMMARY OF THE INVENTION

The present invention solves the above-described problems and provides a distinct advance in the art of lost pet location methods and systems. More particularly, the present invention provides a nationwide, web-based pet registration, search, and retrieval system that is highly effective, inexpensive, and easy to use.

The present invention is preferably implemented with a host computer that may be accessed by users via a communications network such as the Internet. Pet owners may register their pets with the host computer by providing information relating to their pets and contact information such as their name, address and phone numbers. This information is then manually or electronically entered into the host computer where it is stored in a searchable database. If the pet owners move and/or change phone numbers, they may contact the host computer at any time and update their contact information.

A person who finds a lost pet may access the host computer in an attempt to locate the pet's owner. The host computer prompts the finder to enter certain information relating to the pet and then compares the entered information in the database to the information that was previously entered by the pet owners. If a match is found, the host computer provides the finder with the contact information for the pet owner.

In preferred forms, the method of the present invention is used in conjunction with conventional pet vaccination procedures and utilizes a special tag that indicates that a pet is registered with the host computer. Specifically, when a pet owner has his or her pet vaccinated, the veterinarian encourages the pet owner to register their pet with the host computer. The pet owner may do so by manually filling out a form provided by the veterinarian or some other distribution source or by electronically entering the information while on line with the host computer. The entered pet information preferably includes information that is already on a rabies tag that is given to the pet owner after the pet has been vaccinated. The rabies tag information typically includes the veterinarian's name and phone number as well as a series of alpha-numeric digits. The pet owner may also be prompted to provide additional information such as their name, address, phone numbers, e-mail address, the pet's name, the type of pet (i.e., dog, cat, other), the breed of the pet, and the date the pet was vaccinated. Some or all of this information is then stored in the searchable database described above.

Once a pet owner has registered his or her pet with the host computer, he or she is sent a special tag that is to be worn along with the pet's rabies tag. The tag instructs persons who may find the pet to contact the host computer. The host computer then prompts the person who found the pet to enter information from the rabies tag, including the alpha-numeric digits and the veterinarian's name and phone number. The host computer then compares the information entered by the finder of the pet to the information previously entered by the pet owners to try to find a match. If a match is found, the host computer provides the finder of the pet with the contact information for the owner of the pet so that the finder may contact the owner.

The present invention provides numerous advantages over conventional lost pet location methods. For example, the present invention provides a nationwide, web-based pet registration, search, and retrieval system that may be accessed by anyone, from anywhere, and at any time to locate the owner of a lost pet. The method is highly-effective, inexpensive, and easy to use, and therefore is attractive to all pet owners.

Additionally, because the present invention encourages pet owners to register their pets with the host computer before the pets are lost, a person who finds a lost pet may locate the owner of the pet immediately after the pet is found. Moreover, because the contact information for pet owners is stored on the host computer rather than being printed on a tag worn by the pets, and because pet owners may periodically update the contact information on the host computer if they move and/or change phone numbers, the contact information is always current. Therefore, pet owners do not have to order new pet tags each time their contact information changes.

These and other important aspects of the present invention are described more fully in the detailed description below.

BRIEF DESCRIPTION OF THE DRAWING FIGURES

A preferred embodiment of the present invention is described in detail below with reference to the attached drawing figures, wherein.

DETAILED DESCRIPTION OF THE PREFERRED EMBODIMENTS

Figure 1:
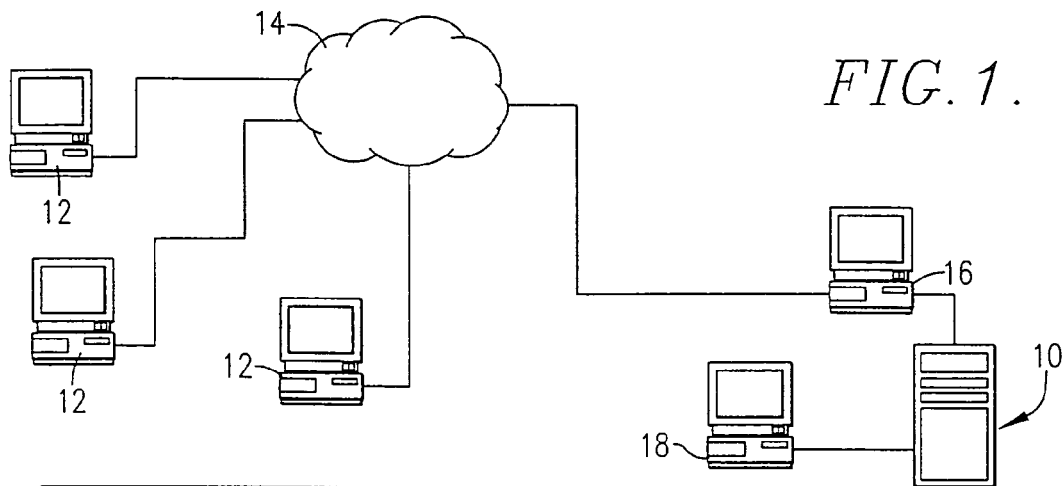
FIG. 1 is a schematic diagram of certain computer hardware that may be used to implement a preferred embodiment of the present invention.

Turning now to the drawing figures, and particularly FIG. 1, computer hardware that may be used to implement the method of the present invention is illustrated. Specifically, the invention is preferably implemented with a host computer 10 that is coupled with a plurality of user computers 12 by a communications network 14.

The host computer 10 serves as a repository for information provided by 20 pet owners and finders of lost pets and is programmed to perform the functions described below. The host computer may be any computing device such as a network computer running Windows NT, Novell Net Ware, Unix, or other network operating system. The computer program that operates the host computer to perform the method of the present invention may be written in any computer language such as C+ and/or HTML as a matter of design choice.

The host computer 10 is preferably connected to another computing device 16 that serves as a firewall to prevent tampering with information stored on or accessible by the host computer and may also be connected with other computing devices such as a computer 18 by a local area network or other network to permit an administrator of the host computer to maintain and monitor the host computer. The host computer preferably includes conventional web hosting operating software and includes an Internet connection such as a modem, DSL converter, or ISDN converter. The host computer is assigned a domain name such as "awolpet.com" so that it can be accessed via the Internet in a conventional manner.

The user computers 12 may be operated by pet owners while registering their pets and finders of lost pets when attempting to reunite the lost pets with their owners. The user computers may be any type of conventional computing devices including personal computers such as the ones sold by Dell, Compaq, Gateway, or other computer manufacturers. The user computers are networked to the host computer 10 via the communications network 14. The communications network is preferably the Internet, but may also be any other type of network such as a local area network, a wide area network, an Intranet, or even a wireless network. Each user computer preferably includes a conventional Internet connection such as a modem, DSL converter, or ISDN converter and a web browser that permits it to access the Internet and the host computer via the communications network.

The above-described hardware may be used for two primary purposes: (1) to permit pet owners to register their pets with the host computer, and (2) to permit persons who find lost pets to search for and locate the lost pet's owners. The hardware may also be used for other purposes such as to permit pet owners who have lost their pets, but who did not previously register their pets, to post information about their lost pets, and to permit pet owners to update information that they have previously stored in the host computer. These functions and features and others are described in more detail below.

Pet Registration

The pet registration procedure allows pet owners to register their pets with the host computer 10 so that, if the pets become lost, people who find the pets can access the host computer and locate the owners. To encourage widespread use of the present invention and to increase its effectiveness, the pet registration process is preferably performed in connection with conventional pet vaccination procedures.

Specifically, once a pet has been vaccinated, the veterinarian gives the owner a rabies vaccination tag for the pet's collar. Tags are purchased from manufacturers specializing in rabies tags. Each rabies tag lists the veterinarian's name and phone number (address in some instances) and has a unique set of digits, usually four, but sometimes up to seven. Each year the rabies tag color and shape changes. The tags are necessary for proof of vaccinations because most state laws require yearly rabies vaccinations. The present invention may be used regardless of the time interval of the vaccinations.

The pet registration process may be performed either manually or electronically. For the manual method, a veterinarian or some other distribution source will give a pet owner a form to complete that seeks information about the pet owner, the pet, and the veterinarian. For example, the form preferably seeks contact information for the pet owner including the owner's name, address (optional), phone numbers (mandatory) and e-mail address (optional). The form also seeks pet information including the pet's name, type of pet (dog, cat, other), breed, rabies tag or other license number, rabies tag color and the date, month and year of vaccination (all mandatory) and veterinarian information including the veterinarian's name, address and phone number (all mandatory). The form may also ask how long the vaccination lasts.

Once the pet owner has completed the form, either the veterinarian or the pet owner mails the form to the administrator of the host computer 10 so that the information may be entered. The pet owner may also be required to send a registration fee along with the form. The information is stored, along with information entered by other pet owners, in a searchable database that may be used to locate lost pets as described below. The searchable database may be stored on the host computer or in external memory accessible by the host computer.

Once the information has been entered into the database, the administrator may send the pet owner a confirmation letter confirming that the information has been received and entered into the database. The confirmation letter may also be sent automatically by the host computer 10 via e-mail. The confirmation letter is accompanied by a pet tag to be worn by the pet that states "I am lost. Go to awolpet.com to find my home" or some similar message. The tag is preferably a red square tag that fits next to the pet's existing rabies tag. As more people begin to use the pet registration and searching services of the present invention, the red tags will become so well known that people who find a lost pet and see the tag will easily and quickly recognize that the pet is registered with the host computer.

Figure 2:
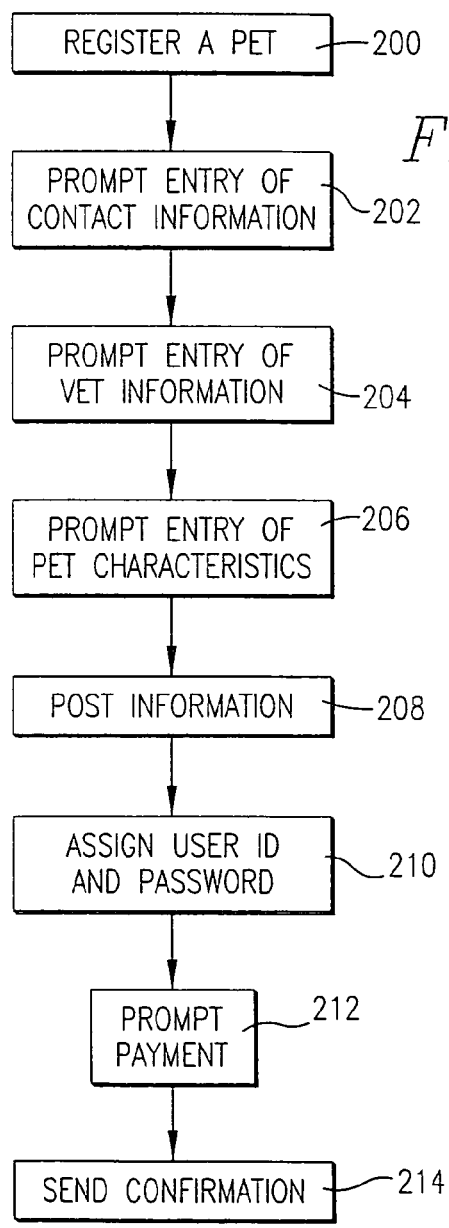
FIG. 2 is a flow diagram broadly depicting the steps performed by a pet owner when registering his or her pet with the host computer.

The electronic registration process is similar to the manual process except that the pet owner enters the information from one of the user computers 12 while on line with the host computer 10. Specifically, as depicted in FIG. 2, a pet owner may access the host computer and select an icon from a user interface screen to indicate that he or she wishes to register a pet as depicted in step 200. The host computer then prompts the pet owner to enter his or her contact information, the pet information, and the veterinarian information as depicted in steps 202, 204, 206. The host computer then posts the information on the searchable database as depicted in step 208 and may assign the user an I.D. and a password as depicted in step 210. The user I.D. and password may be used later by the pet owner to gain access to his or her records in the host computer to change the pet information or contact information as described in more detail below. The host computer may also prompt payment for the services by asking for a credit card number as depicted in step 212. The host computer and/or administrator then sends a confirmation letter and the pet tag described above as depicted in step 214.

To encourage pet owners to seek regular health exams and necessary vaccination, the method of the present invention preferably requires pet owners to renew their registration either yearly or during some other time interval. The renewal process requires a pet owner to complete the pet registration steps either manually or electronically as described above or may merely require entry of information that has changed such as new information on a more current rabies tag. To remind pet owners that they must renew their registration, the host computer 10 may automatically send a reminder notice via e-mail or other means.

Lost Pet Searching

Figure 3:
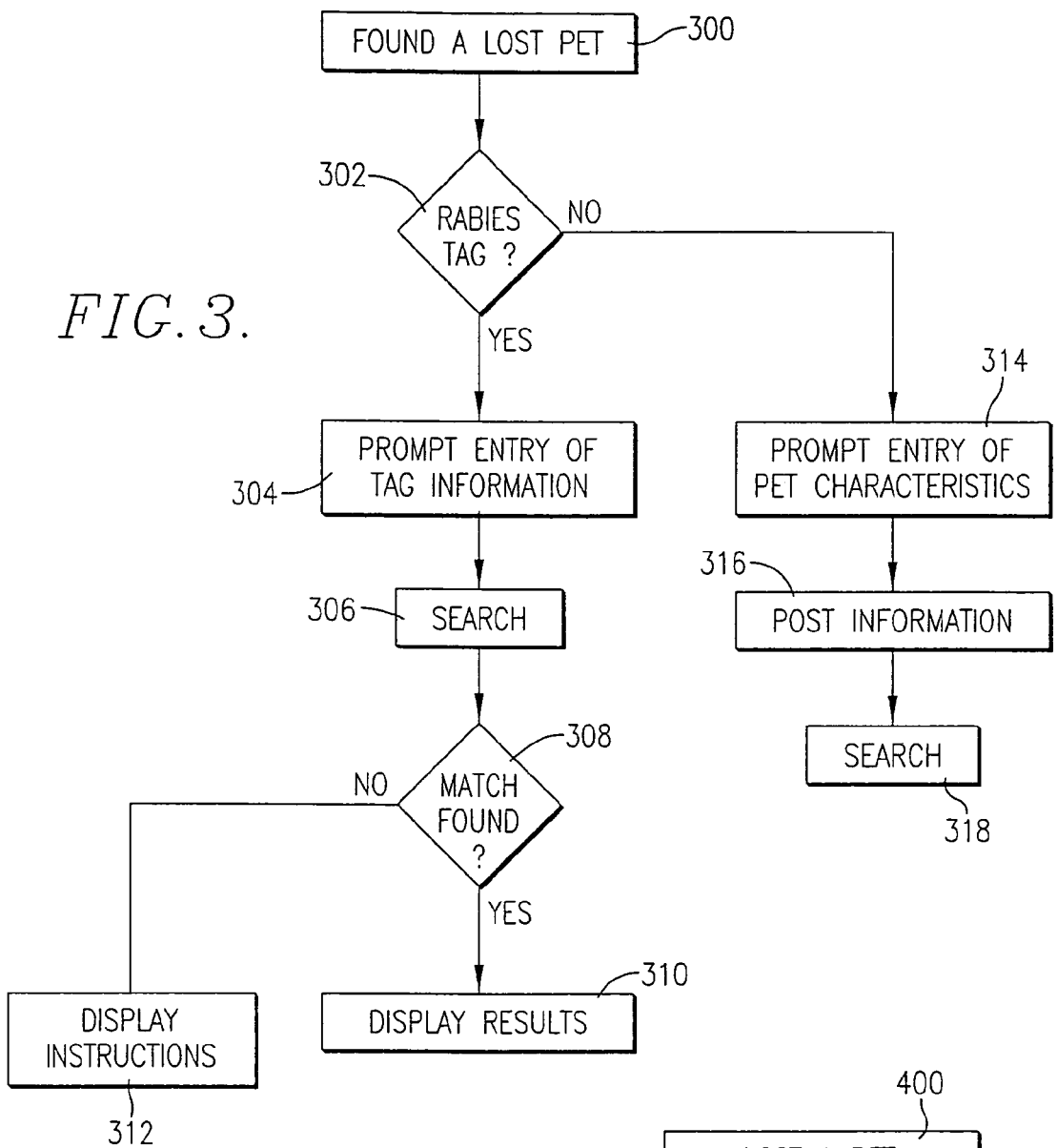
FIG. 3 is a flow diagram broadly depicting the steps performed by a person who finds a lost pet in attempting to locate the pet owner.

The lost pet searching procedures of the present invention allow people who find lost pets to access the host computer 10 and search for the owners of the pets. Specifically, as depicted in FIG. 3, a person may access the host computer via one of the user computers 12 and select an icon on the user interface to indicate that they have found a lost pet as depicted in step 300. The host computer then asks the person whether the lost pet has a rabies tag or other tag having an assigned set of digits in step 302. If the person indicates yes, the host computer prompts entry of the information on the rabies tag, including the veterinarian's name and phone number or some other licensing institution, the rabies tag number, and the year the rabies tag was issued.

The host computer 10 then compares the entered information to the information in the searchable database in an attempt to find a match as depicted in step 306. The search criteria may be any part of the information entered by the person who found the pet. For example, the host computer may only search to determine if the entered rabies tag number matches a rabies tag number in the database or may search. based on other entered information. If a match is found, the host computer displays the pet's name as well as the selected contact information for the owner which may include the owner's name and telephone numbers as depicted in steps 308 and 310. If a match is not found, the host computer may recommend that the person contact the veterinarian as depicted in steps 310 and 312 or may proceed to step 314 as described below.

Step 314 prompts the person to enter characteristics of the found pet if no match was found in step 308 or if the pet did not have a rabies tag as depicted in step 302. The pet characteristics may include the type of pet found (i.e., cat, dog, or other), the breed of the pet, the date the pet was found, and the location where the pet was found. The host computer 10 may also prompt the finder of the pet to enter their name and phone number so that they may be contacted by the owner as described below.

The host computer 10 then posts the information entered by the finder on a computer bulletin board or other memory that may be accessed by the computer 12 as depicted in step 316. The host computer may also perform a search to determine if the entered pet characteristics match pet characteristics that have been entered by an owner of a lost pet as described in the following section.

Locating Unregistered Pets

Figure 4:
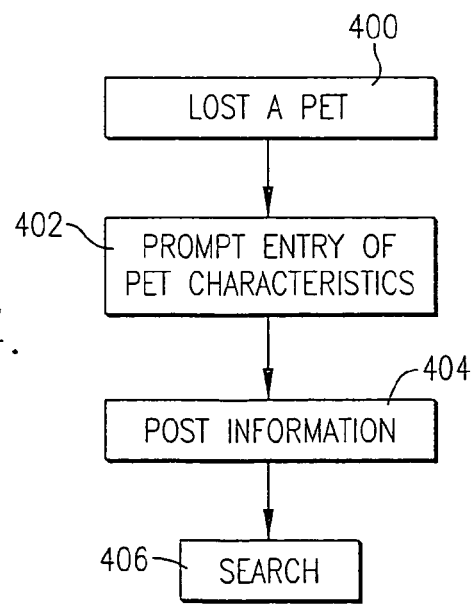
FIG. 4 is a flow diagram broadly depicting the steps performed by a pet owner who has lost a pet and who has not previously registered their pet with the host computer.

The present invention also permits pet owners to post information regarding lost pets on the host computer 10 even if they did not register the pets before they were lost. Specifically, as depicted in FIG. 4, a pet owner may access the host computer and select an icon indicating that they have lost a pet as depicted in step 400. The host computer then prompts the pet owner to enter characteristics of their pet such as the type of pet (i.e., cat, dog, or other), the breed of the pet, the date the pet was lost, and the location where the pet was lost as depicted in step 402. The host computer then posts this information (step 404) in the same area where the pet characteristics for found pets have been posted as described in step 316 above. This permits both owners of lost pets and finders of lost pets to view the information in this lost pet bulletin board in an attempt to find a lost pet. The host computer may also perform a search as depicted in step 406 in an attempt to find a match between the pet characteristics entered by finders of lost pets and the characteristics entered by the owners of lost pets.

Updating Pet Information

Figure 5:
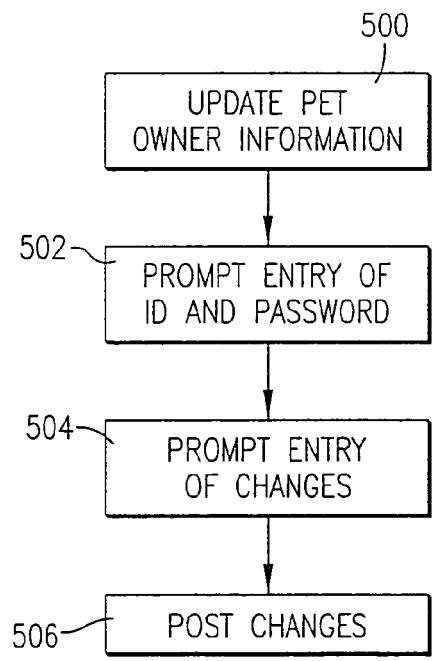
FIG. 5 is a flow diagram broadly depicting the steps performed by a pet owner in updating certain pet information stored on or accessible by the host computer.

The pet updating procedures of the present invention allow pet owners who have previously registered their pets to periodically update any information that has changed since the last registration. A pet owner may do so by contacting the host computer 10 via one of the user computers 12 and selecting an icon indicating that they wish to update their pet information as depicted in step 500 of FIG. 5. The host computer then prompts the pet owner to enter his or her I.D. and password as depicted in step 502 and then prompts entry of changes to the contact information or pet information as depicted in step 504. The host computer then posts the changes to the appropriate database records as depicted in step 506.

Other Features

The host computer 10 may also be programmed to provide other services. For example, the host computer may be accessed by veterinarians to reorder registration forms or by pet owners who desire to obtain information about the pet registration and search services. Moreover, the user interface screens displayed by the host computer may include information about participating veterinarians. This information may include a list of participating veterinarians by state and city and contact information for the veterinarians. This service encourages veterinarians to support and encourage use of the present invention and assists new pet owners in locating veterinarians in their areas.

The host computer 10 may also permit pet owners to post rewards for the safe return of their pets. Finders of lost pets may then collect these rewards after a lost pet has been reunited with its owner.

Although the invention has been described with reference to the preferred embodiment illustrated in the attached drawing figures, it is noted that equivalents may be employed and substitutions made herein without departing from the scope of the invention as recited in the claims. For example, although the method of the present invention preferably searches for lost pets by using the numbers or digits on existing rabies tags, it may also use other information such as codes or numbers that are assigned to the pets by the host computer or the veterinarians during pet registration. Moreover, although the present invention preferably utilizes a separate tag that is worn by pets to indicate that they are registered with the host computer, this information may also be printed directly on the pet's existing rabies tags, on the pet's collars, or on a sticker that can be adhered to the pet's rabies tag or collar.

Additionally, although the present invention preferably provides the finder of a lost pet with contact information that allows the finder to contact the pet owner directly, the host computer may also be configured to provide contact information that allows either the pet owner or the finder of the pet to remain anonymous. For example, the host computer may direct the finder of a lost pet to contact the pet's veterinarian rather than the owner and/or the host computer may permit the finder of a pet to remain anonymous when notifying the pet owner that the pet has been found.

Having thus described the preferred embodiment of the invention, what is claimed as new and desired to be protected by Letters Patent includes the following:

1. A method for locating lost pets comprising:
    (a) issuing a rabies tag to a pet, the rabies tag including information displayed on the rabies tag, the rabies tag information comprising a phone number of a veterinarian, alpha-numeric digits, and a listed year corresponding to when the tag was issued;
    (b) obtaining the rabies tag information in computer-readable memory accessible by a host computer, the host computer accessible over a communications network;
    (c) obtaining pet owner contact information, for reaching the owner of the pet that was issued the rabies tag, in computer-readable memory accessible by the host computer;
    (d) issuing a second tag to a pet that includes an address of the host computer;
    (e) comparing in the host computer, information from the rabies tag received from a party who found a lost pet, to the rabies tag information in the computer readable memory, in an attempt to find a match; and,
    (f) if a match is found, providing the party who found the lost pet with at least a portion of the pet owner contact information.

2. The method as set forth in claim 1, wherein the obtaining the rabies tag information in the computer-readable memory includes storing the rabies tag information in the computer-readable memory, and the obtaining pet owner contact information in the computer-readable memory includes storing pet owner contact information in the computer-readable memory.

3. The method as set forth in claim 2, wherein the communications network includes the Internet.

4. The method as set forth in claim 2, wherein the pet owner contact information comprises information selected from the group consisting of the pet owner's name, the pet owner's address, and the pet owner's telephone number.

* * * * *